O. H. GOETZ.
REAR BUMPER FOR FORD CARS.
APPLICATION FILED NOV. 15, 1920.
1,381,914. Patented June 21, 1921.
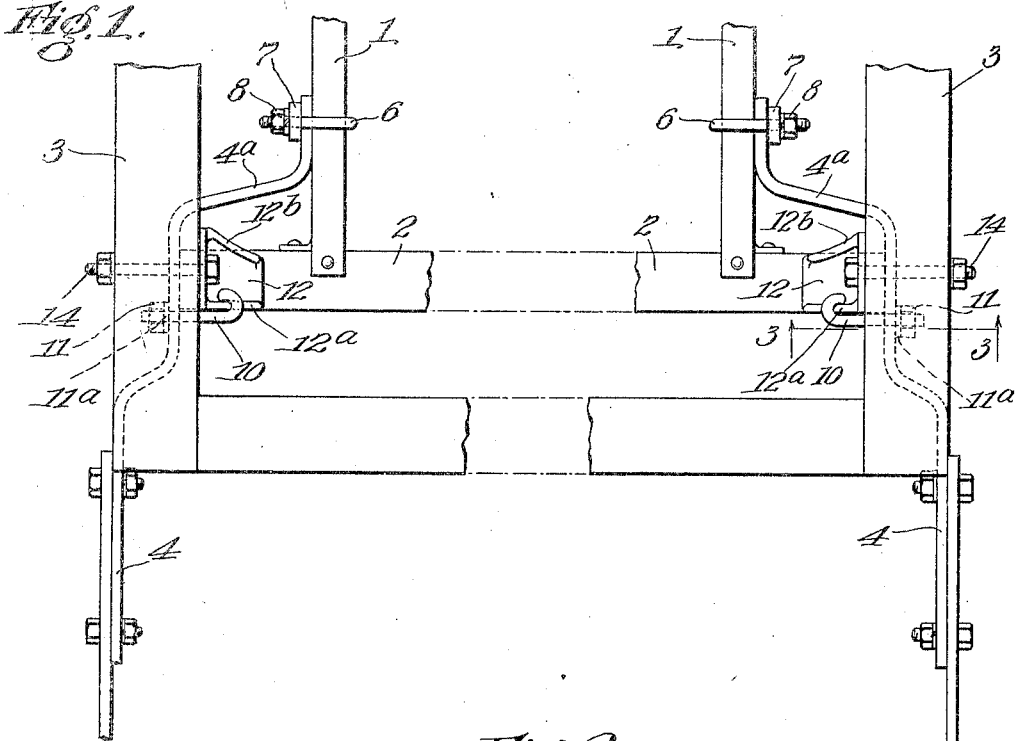
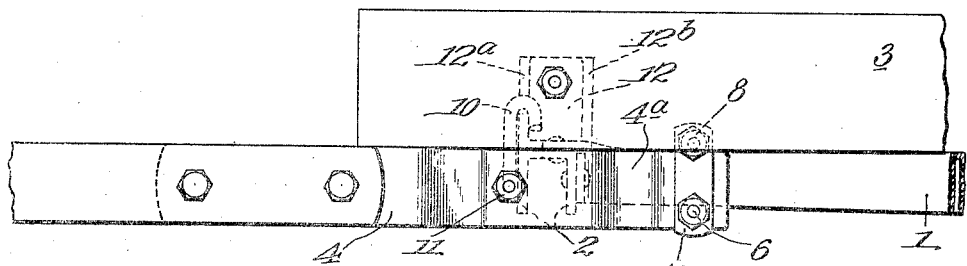
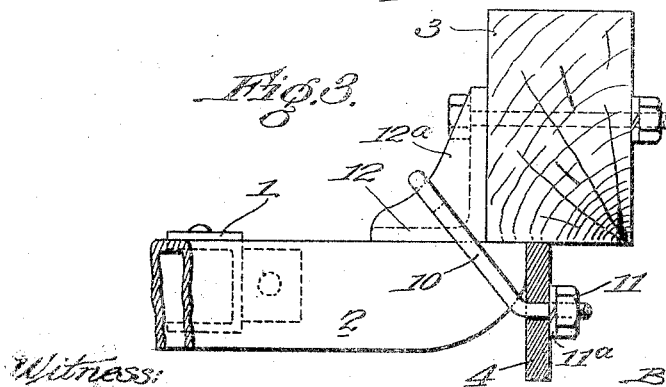 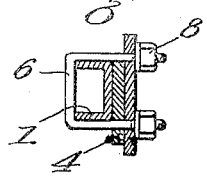
Inventor:
Oscar H. Goetz

UNITED STATES PATENT OFFICE.

OSCAR H. GOETZ, OF CHICAGO, ILLINOIS, ASSIGNOR TO STEWART-WARNER SPEEDOMETER CORPORATION, OF CHICAGO, ILLINOIS, A CORPORATION OF VIRGINIA.

REAR BUMPER FOR FORD CARS.

1,381,914.  Specification of Letters Patent.  Patented June 21, 1921.

Application filed November 15, 1920. Serial No. 424,012.

*To all whom it may concern:*

Be it known that I, OSCAR H. GOETZ, a citizen of the United States, residing at Chicago, in the county of Cook and the State of Illinois, have invented certain new and useful Improvements in Rear Bumpers for Ford Cars, of which the following is a specification, reference being had to the accompanying drawings, forming a part thereof.

The purpose of this invention is to provide an improved means of mounting a bumper on an automobile frame of the type and character which has a longitudinally extending side bar and a connecting cross bar at the end of the side bar, being particularly designed for a rear bumper on a car of the Ford type. It consists in the elements and features of construction shown and described as indicated in the claims.

In the drawings:

Figure 1 is a plan view of a portion of a chassis and body of a car having a bumper mount embodying this invention applied thereto.

Fig. 2 is a detail side elevation of a portion of the part seen in Fig. 1, the remainder being broken away at the line, 2—2, in Fig. 1.

Fig. 3 is a section at the line, 3—3, on Fig. 1.

Fig. 4 is a section at the line, 4—4, on Fig. 1.

In the drawings, 1, 1, are the longitudinal bars of an automobile frame or chassis of the Ford type. 2 represents a rear cross bar. Both the longitudinal bars and the cross bar are channel bars, the longitudinal bars having their channels opening inward, and the cross-bar having its channel opening downward. The cross bar extends beyond the longitudinal bars at the ends and is crossed at its own ends by elements of the frame structure which in general may be referred to as body members, 3, 3, making an inwardly and upwardly opening angle with the upper surface of the cross bar, 2, said body members also overhanging or extending beyond the ends of the cross bar, 2, so as to make downwardly and outwardly opening angles therewith. 4, 4, are brackets or mounts for securing a bumper arm, each of said brackets comprising in general a longitudinally-extending arm adapted to be applied across or past the end of the cross-bar, 2, in the downwardly and outwardly opening angle between said end and the body member, 3, and being rearwardly deflected inward as seen at 4ª, and then at its end deflected directly rearward so as to abut laterally against the longitudinally-extending side bar, 1, to which it is secured by a U-bolt, 6, which clasps the channel longitudinal bar, 1, and is provided with a yoke, 7, applied on its ends outside the end portion of the bar, 4, and secured by nuts, 8, 8. The vertical width of the bar, 4, is desirably greater than the vertical width of the chassis longitudinal frame bar, 1, to an extent to permit one limb of the U-bolt to extend through a bolt hole provided near the lower edge of the bar, 4, thus making the U-bolt attachment more secure than it might be by the mere clamping effect of yoke bar, 7. The bar, 4, is bound in position mainly by being drawn and clamped into the downwardly and outwardly opening angle between the end of the cross-bar, 2, and the body member, 3, and for this purpose there is provided a hook bolt, 10, whose stem passes through a bolt hole in the bar, 4, for receiving a clamping nut, 11, and locking washer, 11ª, outside said bar, the hook end of the bolt being engaged in the upwardly and inwardly opening angle between the cross-bar, 2, and the body member, 3, for which engagement, and to make the same more secure, there is provided an angle fitting, 12, lodged in said upwardly and inwardly opening angle, and having a vertical web, 12ª, with which the hook of the bolt, 11, engages, as clearly seen in Fig. 1. This angle fitting, 12, is secured by its vertical limb to the body member, 3, by means of the bolt, 14; and preferably has not only the web, 12ª, above mentioned for engaging the hook-bolt, but also at its opposite side a similar web, 12ᵇ, for further stiffening it.

I claim:

1. In combination with an automobile frame having a cross-bar and a member which crosses the end of the cross-bar above the same, making an upwardly and inwardly opening angle therewith, a longitudinally-extending bracket arm which abuts laterally against the end of said cross-bar, and an L-hook having its hook engaging said angle and its stem extending through the bracket arm, and tightening means on the end of the bolt.

2. In combination with an automobile frame, a cross-bar and a member which crosses the end of the cross-bar above the same, making an upwardly, inwardly opening angle therewith and which laterally overhangs the end of the cross-bar, making an outwardly and downwardly opening angle therewith, a longitudinally extending bracket arm which abuts laterally against the end of said cross-bar in said downwardly and outwardly opening angle, and a hook bolt having its hook engaging said inwardly and upwardly opening angle and its stem extending through the bracket arm, and tightening means on the end of the bolt to draw the bracket arm into said outwardly and downwardly opening angle.

3. In the construction defined in claim 1, foregoing, the automobile frame having a longitudinally extending frame bar, and the bracket arm being extended past the cross-bar and secured to said longitudinal vehicle frame bar.

4. In the construction defined in claim 1, foregoing, an angle fitting lodged in the inwardly and upwardly opening angle between the cross-bar and the member crossing the same to form a seat for the engagement of the hook bolt, said angle fitting having a vertical web in its angle with which the hook of the hook bolt engages.

In testimony whereof I have hereunto set my hand at Chicago, Illinois, this 12th day of November, 1920.

OSCAR H. GOETZ.